US007690201B2

(12) United States Patent
Kravets (10) Patent No.: US 7,690,201 B2
(45) Date of Patent: Apr. 6, 2010

(54) METHOD OF EFFICIENCY AND EMISSIONS PERFORMANCE IMPROVEMENT FOR THE SIMPLE STEAM CYCLE

(75) Inventor: Aleksandr Kravets, Bridgewater, NJ (US)

(73) Assignee: Veritask Energy Systems, Inc., Bridgewater, NJ (US)

( * ) Notice: Subject to any disclaimer, the term of this patent is extended or adjusted under 35 U.S.C. 154(b) by 766 days.

(21) Appl. No.: 11/268,324

(22) Filed: Nov. 7, 2005

(65) Prior Publication Data

US 2007/0101718 A1 May 10, 2007

(51) Int. Cl.
*F01K 7/34* (2006.01)
(52) U.S. Cl. ......................................... 60/653; 60/679
(58) Field of Classification Search .................. 60/653, 60/679, 681
See application file for complete search history.

(56) References Cited

U.S. PATENT DOCUMENTS

| | | | | |
|---|---|---|---|---|
| 2,568,787 A | * | 9/1951 | Bosch | 60/39.17 |
| 4,617,878 A | * | 10/1986 | Paquet | 122/422 |
| 5,501,162 A | * | 3/1996 | Kravets | 110/347 |
| 6,854,273 B1 | * | 2/2005 | Lasley et al. | 60/646 |

* cited by examiner

*Primary Examiner*—Hoang M Nguyen
(74) *Attorney, Agent, or Firm*—Kaplan Gilman & Pergament LLP (57) ABSTRACT

A method for improvement of a fossil fuel energy conversion into electrical energy for the simple sub- and supercritical steam cycle is proposed through introduction of additional regenerative cycle duties to improve the evaporation rate per unit of fuel burned, thus minimizing condenser heat loss of the working media. The additional duties provide a supplemental energy credit in the form of heat input to a steam generator where a modified combustion process is realized to convert fossil fuel into carbon monoxide and hydrogen at atmospheric pressure and thus achieving an essential reduction of nitrogen oxides (NOx) formation. The additional duties also involve a direct contact heat transfer to recover latent and thermal energy, contained in the discharged combustion products to provide yet another energy credit that satisfies both conventional and/or added regenerative cycle duties. A water surplus is also achieved in the said process of heat recovery from the combustion products to significantly improve water usage of the simple steam plant. The proposed heat recovery process also minimizes coolant usage while achieving a complete water recovery from combustion products and maintaining draft capabilities in the stack.

2 Claims, 2 Drawing Sheets

Proposed Power Plant Arrangement

Figure 1. Proposed Power Plant Arrangement

Fig.2. Waste Heat Recovery System

METHOD OF EFFICIENCY AND EMISSIONS PERFORMANCE IMPROVEMENT FOR THE SIMPLE STEAM CYCLE

BACKGROUND OF THE INVENTION

Any fossil fuel power (energy) generation system involves combustion of fuel/air mixture. Depending on means of the fuel energy conversion into electricity at least two major types of power plants exist, that exploit technologies known as steam and gas cycles.

In the steam cycle energy released in combustion process is used to generate steam, which thermal energy undergoes two-stage conversion into mechanical and electrical energy. In the gas cycle the energy of the pressurized combustion products converts directly into mechanical energy and then into electricity. The subject of this invention deals directly with the steam cycle and the dual steam-and-gas cycles (a.k.a. combined cycle) where steam cycle is a part.

Steam power plants currently dominate power generation world wide. In this cycle chemical energy of fuel is released by means of combustion within the pressurized vessel (boiler) cooled by high pressure water (working media). High pressure water converts into steam, which expands to turn steam turbine and drive a generator for production of electricity.

Upon exit from the turbine steam undergoes condensing to allow an economic utilization of the purified water. During condensing a major portion of steam energy in the form of latent heat is lost. This energy loss in the steam cycle amounts to 40%-45% of the fuel energy. Second major source of energy losses in the cycle is the energy of the combustion products (or flue gas) leaving boiler. Energy contained in the combustion products depends on type of fuel fired (gas, coal, oil) and in average for modern boilers ranges from 12% to 18% of fuel energy. There are other losses due to friction, incomplete combustion, losses to surroundings, etc. that amounts to 5% to 7%. As the result the efficiency of fuel-to-power energy conversion for the modern power plant peaks at about 35% and for average US steam power plant is about 33%.

These relatively high efficiencies were achieved by the prior art by means of fuel energy recuperation, regenerative water heating, and steam reheat. The fuel energy recuperation is achieved through water and combustion air preheat before they supplied to the boiler furnace where water boiling actually takes place. This preheat is provided within an integral part of the boiler called Heat Recovery Area. Further heat recovery from combustion products is restricted by multiple reasons. The major one is a moisture condensation from combustion products when cooled below dew point. Moisture in combustion products resulted from combustion of hydrogen present in a hydrocarbon fuel, and moisture content in the fuel and air. When such condensation occurs in the presence of carbon and sulfur dioxide it produces high concentration acid that attacks heat transfer surface or exhaust stack material. Therefore, costly materials are required to prevent substantial equipment damage and loss of operational time (plant availability and operation reliability).

The invention relates to the fossil fuel power generating systems and specifically to a high performance system having a primarily embodiment of the power plant realizing a simple steam cycle.

The conventional, simple steam cycle dominates power industry. However, the efficiency of the fuel-to-electric power conversion in the simple steam cycle on average is around 35% and for most advanced systems does not exceed 40% relative to the higher heating value of the fuel. The major reason for the low fuel energy-to-electricity conversion is the intrinsic heat loss with a latent heat of the working media in the condenser (about 50%). The second most significant reason is the heat loss with the combustion products in the stack, which may vary from 10% to 20% depending on conditions of operation and fuel fired. Yet, an another drawback associated with operation of fossil fuel power plant is the atmosphere pollution with carcinogenic nitrogen oxides. The low efficiency of the simple steam cycle is also responsible for an excessive carbon dioxide emission—the major part of green house gases. Consider the limitations of the prior art in the details.

Since commercial introduction of the simple steam cycle, in the middle of $19^{th}$ century, its efficiency improvement had two major pathways, such as 1)—regenerative feedwater heating by heat recovery from the working media passing through steam turbine, and 2)—heat recovery from the combustion products. Another valuable avenue for fuel-to-energy efficiency improvement includes steam parameters increase and steam reheat. Although these means do not affect the essence of this invention and therefore they will not be taken into consideration hereafter.

Before introduction of the regenerative feedwater heating (hereafter also referred to as regenerative duties), a significant loss of the thermal energy with the latent heat of the working media occurred in condenser. After adoption of the regenerative duties (a.k.a. regenerative steam cycle), the steam extraction from the various stages of turbine provided heat credits to the condensate of working media as it is pumped back to the boiler. Almost 20% of cycle heat loss reduction due to use of the regenerative duties can be estimated by a comparison of the area representing unavailable heat for ideal steam cycles. The regenerative duties have certain optimum values as defined by the number of regenerative heaters is determined by the parameters of the working media and typically, therefore establishing some specific limits which and is selected to maximize the steam cycle efficiency has maximum value. Deviation from such optimized conditions results in the decline of fuel-to-power conversion.

Another most significant source of heat loss that affects fuel consumption, i.e. the efficiency of fuel-to-energy conversion, is the heat loss of the sensible and latent heat with the combustion products rejected to the atmosphere. These losses, accounting for up to 10%-18% of fuel energy loss, have long been tolerated for a variety of engineering and economic reasons.

On the one hand, a low convection heat transfer coefficient and the low temperature of the flue gas would require large heat exchangers. At the same time, the high moisture in the combustion products would require expensive corrosion-resistant material. Additionally, the presence of sulfur in the fuel will further aggravate the heat exchangers operating conditions, resulting in reduced boiler reliability and increased maintenance costs. Therefore, thanks to the abundance of fossil fuel, and its low price in the past, there were no strong economic incentives to address these losses. It is this combination, which has prevented engineering and operating companies from further pursuing fuel utilization improvement by waste heat recovery from combustion products rejected to the atmosphere.

Losses with the combustion products rejected into atmosphere (a.k.a. stack losses) for the typical operating conditions of the simple steam cycle for power/industrial applications. The losses are distinguished by the source, specifically the fraction of losses due to moisture content (including latent heat), and the sensible heat content of the dry flue gas.

Economics of large utility and industrial-size boilers has stimulated the most efficient utilization of fuel in the boilers, especially for the electric power generation. Here the heat leaving boiler furnace is recovered by means of the feedwater (economizer) and combustion air preheating. However, further heat recovery is prevented mostly by the rate of heat transfer surface corrosion due to moisture condensation from the flue gas. Typical exit flue gas temperature for power/industrial steam generators is approximately 330° F. to 350° F. to provide a necessary margin above flue gas dew point. Even with this margin, corrosion is frequently a problem at the gas side of the air-heater exit, due to low temperature of the combustion air supply. This need for margin eventually determines the level of the heat losses with the exit flue gas.

To minimize this margin steam is often used to preheat combustion air before entering the forced draft fan in order to avoid air-heater damage. In turn, such use of steam also leads to the power generation loss or further reduction of the fuel-to-energy conversion efficiency, which is accepted due to offset the cost of maintenance and repair.

During the past 30 years, the United States and other industrialized and developed countries have been working to improve fuel efficiency, related to boiler exit flue gas losses. Some solutions were proposed that involved the heat transfer surface made of corrosion resistant materials such as quartz, or thermally resistant glass, or stainless steel. However, high capital and operating costs, as well as reliability and maintenance issues, ultimately led to rejection of this solution by operating companies.

The lack of interest toward energy recovery from the combustion products rejected to the atmosphere especially for the stand alone applications is also explained by its low-grade energy. If implemented it could be used only as the replacement of the conventional duties, therefore representing an unnecessary trade-off with the marginal or even questionable cycle duty improvement. Thus, recovery of the rejected heat with the existing concepts of the simple steam cycle for the stand-alone plants does not present a viable option from both engineering and economical stand point, therefore making these losses unavoidable.

Environmental aspects of the simple plant performance also present many challenges concerning NOx emissions reduction. The in-furnace emissions suppression is typically achieved by means of ultra-low NOx burners along with deep air/oxidizer staging provided by over-fire air ports. However, these means alone do not suffice the environmental regulations. Therefore, to meet stringent environmental regulations for NOx emissions suppression, the natural gas and coal re-burn where introduced where portion of fuel was injected in furnace between the main combustion and burnout zone. The latter one is often called the over fire air zone. The re-burn technologies are also competing with very efficient post-combustion technologies such as selective catalytic (SCR), non-catalytic (SNCR), or the combinations of above that bring NOx emissions to very low level to meet or even surpass current environmental regulations. However, both re-burn and the post-combustion systems incur significant capital and operating expenses, therefore adversely influencing the economics of fossil power plant operation.

In addition, low efficiency of fuel-to-electric power conversion is also responsible for essential carbon dioxide emissions therefore forcing seriously consider an expensive $CO_2$ sequestration options. For this reason, significant efficiency improvement is the economically preferred way of coping with carbon dioxide emissions and hazardous NOx rate reduction.

BRIEF SUMMARY OF THE INVENTION

Accordingly, it is an object of the present invention discloses to provide a method of power generation to effectively diminish the disadvantages of the prior art, in particular, fossil fuel fired power stations having an embodiment of the single steam cycle.

More particularly, it is the first object of present invention to improve efficiency fuel-to-power conversion, by providing additional duties that involving preheat of fuel, and/or steam, and/or flue gas before subjecting them to the modified combustion process and thus significantly reduce fuel consumption and carbon dioxide emissions.

It is also the second object of this invention to provide a cost-effective solution for a low-potential waste heat recovery to further reduce fuel consumption.

It is also the third object of this invention to significantly improve an in-furnace reduction of nitrogen oxide emissions (NOx) as the concurrent effect of the fuel-to-energy efficiency improvement.

It is also the fourth object of this invention to improve water balance of the power plant to achieve an utmost moisture recovery from the combustion products before discharging them to the atmosphere.

In keeping with the first object, one feature of the invention resides in a method of major cycle efficiency improvement by providing additional thermal duties (input) within the embodiment of the simple steam cycle to replace a portion of a fuel input, thus improving fuel-to-electrical power conversion rate, i.e. efficiency.

In keeping with the second object, another feature of the invention resides in a method of providing additional thermal duties (input) within the embodiment of the simple steam cycle to preheat either one or all streams involved in the power generation process including air, working media, flue gas re-circulation, and fuel to replace yet additional portion of the fuel input, and therefore, improving fuel-to-electrical power conversion rate.

When the power generation is performed in accordance with the first and the second objective of this invention, the fuel consumption as well as carbon dioxide emissions are significantly reduced, thanks to said additional thermal duties, that provide a supplemental heat input to the furnace of a steam generator in the form of the heated stream of steam, or carbon dioxide, or fuel, or feed water, or any mixture of the heated steam, carbon dioxide, oxygen, nitrogen, and fuel.

In keeping with the third objective, one feature of the invention resides in a method of fuel combustion by providing essentially biased flows of 1) a near-stoichiometric mixture consisting predominantly of fuel and heated steam, and/or fuel and carbon dioxide, and/or fuel and mixture of steam and carbon dioxide, and/or fuel and mixture of flue gas, to reduce parent fuel composition to CO and $H_2$ and 2) igniting an essentially sub-stoichiometric mixture consisting predominantly of reduced parent fuel and oxidizer such as preheated air and/or oxygen and 3) an addition of the oxidizer balance downstream of the last combustion zone at the location that allows maximum NOx distraction while minimizing loss of the combustible components. Due to such bias, the parent fuel is respectively subjected to either reduction to CO and $H_2$ or combustion reactions. Thus, for the fuel rich zone(s) consisting of near-stoichiometric mixtures of fuel and heated steam, and/or fuel and carbon dioxide, and/or fuel and mixture of steam and carbon dioxide, and/or fuel and mixture of flue gas, the oxidizer may be supplied in the quantities of 0% to 25% with respect to the stoichiometry of combustion reactions. Therefore, said mixtures of fuel undergo predominantly exothermic reactions of the parent fuel conversion into CO and $H_2$. Thanks to the autothermic nature of the exothermic reactions and/or the thermal energy supplied from the adjacent combustion zone(s), the said conversion of the parent fuel under essential oxygen deficient conditions yield a significant transformation to CO and $H_2$. These components being subjected to the subsequent combustion process produce about an order magnitude of NOx emissions reduction therefore relying only on primary means, i.e. combustion equipment. When implemented the proposed method of combustion eliminates or drastically reduces the need for post-combustion NOx suppression such as SCR or SNCR or their combination.

In keeping with the forth objective, one feature of the invention resides in the waste heat energy recovery, where the combustion products undergo a three stage cooling process including 1) an extensive mixing of said combustion products with the water to bring temperature of the mixture near due point thus providing conditions for effective absorption of both physical and latent heat contained by combustion products, and 2) cooling by combustion products exiting the third stage of final combustion products cooling, where, on one side of said heatexchanger, the moisture remaining in combustion products is condensed on the corrosion resistant heat transfer surface, and on the other side of said heat exchanger, the dry flue gas regains some thermal energy, and 3) cooling by ambient air and/or cold water after second stage to reach practically attainable water recovery from the combustion products.

When heat recovery process is performed according to forth object of this invention the moisture from the combustion products is removed while need for expensive corrosion resistant heat transfer surface is greatly minimized and the use of water or other liquid coolant as a medium for waste heat recovery is diminished, thus improving economics of operation, as well as reliability of operation. Due to presence of moisture in the flue gas resulting from combustion process the water surplus is generated and water balance of a power plant is improved. Generated water surplus can be further used as the make-up water in the said simple steam cycle or establish a reliable source of water supply for other commercial needs.

DESCRIPTION OF THE INVENTION

The said method of the fuel-to-electric power generation process within the embodiment of the simple steam cycle involves introduction of the additional thermal duties supplementing steam generator input in the form of gaseous reactants in a near-stoichiometric amount of 1) fuel and steam, and/or 2) fuel and preheated carbon dioxide, 3) fuel and reheated combustion products, and/or 4) fuel and mixture of steam, and preheated combustion products to replace a portion of fuel energy required for evaporation of the working media, therefore diminishing fuel consumption and $CO_2$ emissions. The said components of mixtures absorb their energy from a combination of means including working media and products of combustion. The distinct feature of this invention resides in the utilization of energy contained in the steam that passes through the steam turbine performing mechanical work and then extracted before condenser, thus diminishing major steam cycle loss, i.e. loss in the condenser. The energy of extracted steam supplements fuel input and to this end can be 1) directly injected into the furnace and/or may be used to 2) evaporate another water stream that is subsequently injected in the furnace and/or 3) preheat carbon dioxide prior to injection into furnace and/or 4) preheat the combustion products prior to injection into furnace and/or 5) drying coal before grinding and/or 6) preheating the mixtures consisting of fuel and the other components selected from a group of gases such as steam and/or carbon dioxide and/or combustion products. The said method of the fuel-to-electric power conversion improvement can be further explained by FIG. 1 that presents one of preferred embodiments of the proposed simple steam cycle but it is not limited to the particular configuration shown.

Figure 1:
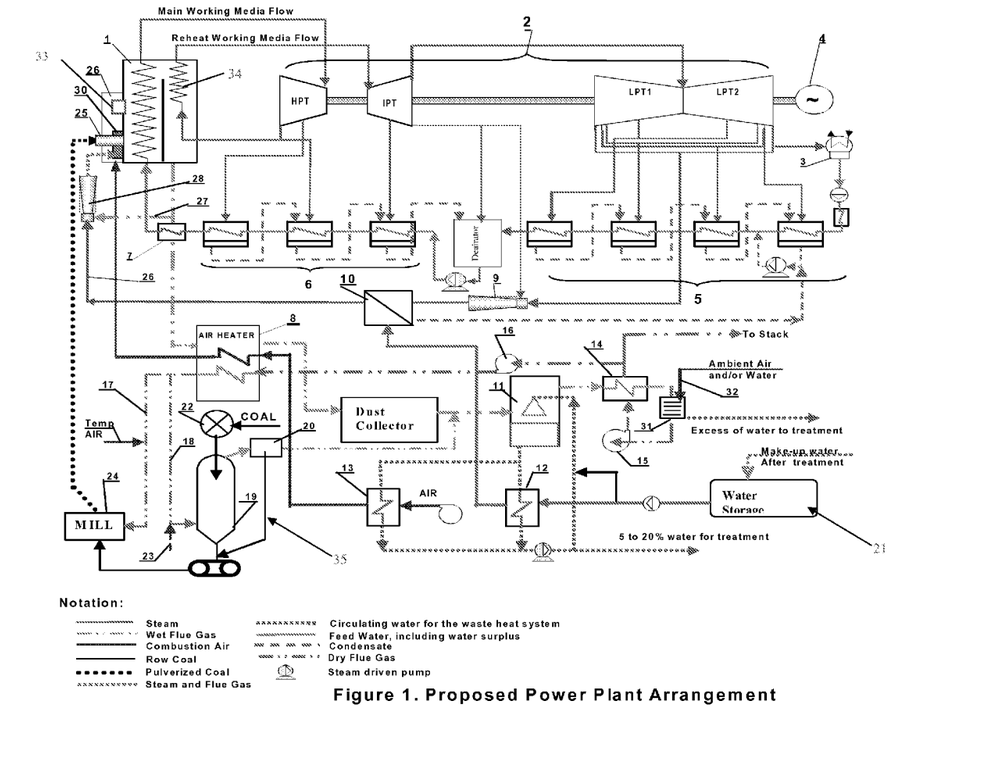
FIG. 1 diagrams the contents of a fossil-fuel fired power generating system employing current invention

To explain the benefits of the proposed simple steam cycle improvement, the notations in FIG. 1 will be also used to explain the performance of typical simple steam cycle. The simple steam cycle (power plant) consist of a steam generator 1, a steam turbine 2 hydraulically linked to a condenser 3, whereas the rotor of turbine 2 is mechanically connected to electrical generator 4. Several stages of the regenerative feed water heaters 5 and 6 provide a significant efficiency improvement of the simple steam cycle, as they are known in the prior art.

The working media initially undergoes preheat in the group of regenerative heaters 5 and 6 using steam extraction from turbine 2 where portion of energy required for evaporation of the working media is received. The major portion of the working media energy, which is required for its evaporation, superheat, and reheat, is delivered in the steam generator 1, thanks to the heat released by combustion of a fossil fuel using burner(s) 25 (boiler shall have at least one burner whereas multiple burners are typical). Besides fuel, additional heat input is provided with combustion air that assumes its energy in the air-heater 8 due to heat recovery from combustion products leaving steam generator. The superheated working media expends through turbine 2, where its energy converts into mechanical energy assumed by the rotor of turbine, and consequently the rotor of electrical generator 4. Due to imposed electro-magnetic field on the electrical generator 4, the rotation of rotor produces a desired electrical output of the power plant. The low energy working media leaving turbine 2 is condensed in condenser 3, and then returns back to regenerative heater to repeat the cycle and to sustain an economic operation.

A simplified heat balance for the typical simple steam cycle, as explained above, having fuel consumption (B1), main steam flow Wmain, and reheat flow Wreheat can be written as follows $$\frac{B1*HHV + Woxidizer*hox =}{\text{Total Input}} \quad (1)$$

$$\frac{Wmain*(hs-hw) + Wreheat*(hreheat, \text{out} - hreheat, \text{in}) +}{\text{Total Useful Thermal Output}}$$

$$\frac{L_{FG} + Lcond + Lother,}{\text{Total Losses}}$$

where:

HHV, hs, hw, hreheat,out, hreheat,in—are higher heating value of fuel and enthalpies of the main steam, feed water entering steam generator, reheat steam outlet and reheat steam inlet, respectively.

Woxidizer, hox—are oxidizer flow and its enthalpy at the outlet of airheater 8.

$L_{FG}$, Lcond, Lother—are cycle losses, respectively including waste heat with combustion products leaving airheater 8, heat rejected to condenser 3 (about 45% see FIG. 1), and other less significant losses due to incomplete combustion, and heat losses to surrounding, mechanical losses associated with power generating equipment such as motors, fans, blowers, etc.

To minimize fuel consumption the methods developed in the prior art included regenerative heaters 5 and 6 to increase the enthalpy of the feed water entering steam generator (hw), while reducing losses in the condenser 3, and combustion products waste heat recovery in economizer 7 and airheater 8. As Equation 1 suggests, for any given conditions, the higher hw and hox the smaller fuel consumption is required, thus improving efficiency of fuel-to-electricity conversion.

In accordance with present invention and one of its preferred embodiment of the simple steam cycle as shown in FIG. 1 the improvement of fuel-to-power conversion is achieved by extraction a major portion of a low-level working media from turbine 2 (denoted as LPT1 and LPT2) and a smaller portion of the mid-level pressure working media (denoted as IPT) and subsequently subjecting low-level working media to a compression in the steam compressor 9. Following compression in 9 the compressed steam flow is subjected to heat exchanger (evaporator) 10 for evaporation of the water stream preheated in heat exchanger 12. Finally, this reheated steam is injected into combustion zone either through burner 25, installed in the plenum 26 for oxidizer supply and/or additional nozzles located in plenum 30. Prior to injection into burner 25 or plenum 30 evaporated steam can be reheated by direct mixing which high temperature flue gas stream 27 using said steam motive energy in eductor 28. As it will become apparent hereafter, the rate of steam injection expressed as a ratio of steam injection to fuel will vary in accordance with this patent between 0.2 to 2.2. Thus, this additional duty formed as the steam injection Winjection into furnace shall be accounted as the heat credit when one would rewrite the energy balance equation 1 for the simple steam cycle using new fuel notation B2:

$$B2*HHV + Woxidizer*hox + Winjection*hinjection = Wmain*(hs-hw) + Wreheat*(hreheat,out - hreheat,in) + L_{FG} + Lcond + Lother, \quad (2)$$

Indeed, the losses in condenser 3 will be reduced, while losses with flue gas will increase correspondingly. However, since fraction of fuel was replaced with the steam the fuel consumption B2 becomes less than B1. The estimated fuel saving may be expressed in terms of (B1−B2)/B1*100% for three major fuels using equation 2 and the following operating conditions: 1) pressure in condenser is 2.5 in Hg, 2) combustion products exhaust temperature is 350° F., 3) temperature of the steam injection into furnace is 800° F. Here it was also assumed that any reduction of combustion products temperature is compensated by a proper adjustment of the heat transfer surfaces in the steam generator to maintain required steam rate and temperature.

Equation 2 suggests that for any given operating conditions the efficiency of fuel-to-electricity conversion increases for the higher heat content (hinjection) and rate (Winjection) of steam injection. The largest improvement is expected for lower heating value fuels such as coal. For applications where high quality feed water is not readily available or expensive to generate, the modification to the proposed simple steam cycle could be applied as shown in FIG. 1. Here additional duties involve evaporation of the lower quality water stream from water storage 21 in the evaporator 10 where generated lower quality steam undergoes reheat in eductor 28 and then is injected into a furnace through plenum 30 located within plenum 26 and having opening toward the furnace of the boiler 1. The notation and operation details of this approach are the same as it was explained for the configuration shown in FIG. 1. In this configuration, the high quality condensate is returned back for regenerative heating after transferring its energy to the water stream collected in 21 thus maintaining the economics of operation.

Yet, another simple steam cycle arrangement using the same said duties is beneficial in another preferred cycle configuration as it is shown in FIG. 1, where heat of the extracted steam from turbine undergoes compression in jet-compressor 9 and evaporate low grade water in heatexchanger 10 is further used to preheat the flue gas and/or fuel in the eductor 28, therefore supplying the additional sensible heat along with the fuel stream. Here, for mixture of fuel and flue gas very little, if any chemical reaction between constituencies of the said mixture will take place thanks to relatively low temperature of the preheat and the short residence time. Therefore, no more than typical corrosion rate of the heat transfer surfaces is expected. Preheated mixture of fuel with flue gas is further supplied to the main combustion zone. Here the loss of high quality condensate is also avoided as it was in the arrangement depicted in FIG. 1 thanks to the use of lower quality water from storage 21 and heat exchanger 10 and 12.

For coal firing plant additional duties may also involve using steam to evaporate surface moisture, thus increasing higher heating value of the fuel (HHV) and reducing heat losses with the flue gas, therefore improving fuel-to-power conversion as follows from Equations (1) and (2).

In keeping with power-to-energy efficiency improvement objective of this invention the coal surface moisture removal using working media energy recovery concept as proposed in this invention also becomes as another alternative duties of the simple steam cycle. The effect of coal drying prior to the grinding in the mill has a numbers of advantages. The first one is increase of higher heating value (HHV) that diminishes coal consumption as follows from Equation 1 and Equation 2. Besides HHV improvement, the mill grinding capabilities are improving resulting in the finer coal grinding and subsequent improvement of the unburned carbon losses. Therefore, coal pre-drying as the additional duty before grinding alone leads to the complementary fuel saving especially for fuels with high surface moisture content. When coal-drying duty is used in combination with the high temperature steam injection into furnace, the further improvement of the fuel-to-power conversion is achieved.

In keeping with the another objective of the patent, NOx reduction is also achieved thanks to injection of steam and/or carbon dioxide, and/or combustion products or the mixture of said gaseous media in the zones with low oxidizer concentration. Such mixture within the low oxidizer concentration zones undergo predominantly endothermic reactions of fuel conversion to CO and $H_2$ that may be performed concurrently with combustion reactions under essentially sub-stoichiometric conditions. Practice shows that concurrent processes involving endothermic and combustion reactions under super-low-stoichiometry for gasification can be an autothermic [1,2]. Moreover, thanks to the heat absorbed through the proposed additional duties in the cycle, and the radiant heat provided by the combustion zones with oxidizer concentrations closer to a fuel specific stoichiometric conditions will provide necessary heat to sustain the proposed combustion autothermic regime therefore improving the yield of endothermic reactions.

The energy balance for said endothermic reactions are independent of reactions pathway and could be obtain using their global expressions and specific values for energy of formation for the reactants and the products. The results of such balances are as shown below, where superscript "g" denotes the state of the water vapor (steam)

$$CH_4 + H_2O^g \Leftrightarrow CO + 3H_2 + 206.2 \times 10^6 \text{ J/kmol}, \quad (3)$$

$$2CH_4 + 2H_2O^g \Leftrightarrow 2CO + 4H_2 + 412.4 \times 10^6 \text{ J/kmol} \quad (4)$$

$$CH_4 + CO_2 \Leftrightarrow 2CO + 2H_2 + 247.4 \times 10^6 \text{ J/kmol}, \quad (5)$$

$$C + H_2O^g \Leftrightarrow CO + H_2 + 131.4 \times 10^6 \text{ J/kmol}, \quad (6)$$

$$C + CO_2 \Leftrightarrow 2CO + 172.5 \times 10^6 \text{ J/kmol} \quad (7).$$

For any given hydrocarbon fuel these reactions may be written as follows:

$$C_nH_mO_k + (n-k)H_2O^g \Leftrightarrow nCO + (0.5m+n-k)H_2 + \text{Heat}, \quad (8)$$

$$C_nH_mO_k + (n-0.5k)CO_2 \Leftrightarrow (2n-0.5k)CO + 0.5mH_2 + \text{Heat}, \quad (9).$$

For the typical main combustion zone temperatures in the steam generator and operating pressures, the equilibrium of the reactions (3) through (9) significantly shift to the right, i.e. toward CO and $H_2$ formation. At the same time, the higher temperature of the injected steam or combustion products or their mixture, or the temperature of the fuel and steam, and/or fuel and combustion products, the higher would be the production rate of CO and $H_2$ for any given combustion conditions in the steam generator. Thus, thanks to the thermal duties as outlined above and shown in FIG. 1 the heat required to complete said fuel conversion reactions (3) through (9) will be reduced. The decline of the thermal effect shown for endothermic reactions constitutes a respective increase of combustion heat effect for the products resulted from parent fuel conversion by reactions (3) through (9).

Based on thermodynamic analysis, the equilibrium concentrations for reactions (3) through (9) are determined by so-called equilibrium constants. Employing the empirical values of equilibrium constants [3] the total weight of CO and $H_2$ or yield for different temperature levels and atmospheric pressure are presented in Table 1. This data indicates that for typical temperature range of 2400° F. to 3200° F. in a steam generator furnace almost complete fuel conversion to CO and $H_2$ is feasible. Experimental study as shown in [3] also suggests such conversion rate improvement with the coal particles size reduction.

TABLE 1

Total volume of CO and $H_2$ (wt. %) for reactions (3), (4) through (9)

| Fuel conversion reactions of interest | Temperature Level, K (F.) | | | | |
|---|---|---|---|---|---|
| | 600 (620) | 800 (980) | 1000 (1430) | 1200 (1700) | 1400 (2060) |
| $CH_4 + H_2O^g \Leftrightarrow CO + 3H_2$ | 1.0 | 19.0 | 73.5 | 95.5 | 97.2 |
| $CH_4 + CO_2 \Leftrightarrow 2CO + 2H_2$ | 3.0 | 17.0 | 71.0 | 95.5 | 97.5 |
| $C + H_2O^g \Leftrightarrow CO + H_2$ | 1.66 | 8.8 | 80.3 | 97.9 | 98.5 |
| $C + CO_2 \Leftrightarrow 2CO$ | 0 | 1.9 | 8.5 | 95.9 | 97.2 |

Numerous experimental studies and practice [4,5] show that for similar stoichiometric conditions NOx formation considerably higher when firing any hydrocarbon fuel in comparison with combustion of their products of reduction to CO and $H_2$. This difference reaches an order of magnitude in comparison with the parent fuel.

During coal combustion, almost 60% to 80% of NOx can be explained by nitrogen content in the fuel. In the conventional combustion process, the fuel nitrogen reacts with the hydrocarbon radicals forming intermediate and unstable spices such as CN, HCN, and $NH_i$. They further could evolve into hazardous nitrogen oxides. In the proposed combustion process under atmospheric pressure the high process temperature favors coal nitrogen conversion into a more stable molecular nitrogen ($N_2$) [1,2], thus significantly diminishing formation of NOx.

NOx reduction by steam or flue gas injection is a proven method of NOx suppression used in the prior art [1,4]. The rate of NOx reduction for coal fired boiler increases over conventional methods by utilizing the method and apparatus of the current invention proposed methods. For conventional process, the reduction of combustion zone stoichiometry below about 0.7 results in the drop of flame core temperature, therefore suppressing the devolatilization of coal, and in turn, negating the mechanism of NOx reduction by the conventional staged combustion.

In the invention's method, due to injection of the preheated steam or flue gas or their mixture, the temperature of the fuel in the said mixture increases under ultra-sub-stoichiometric conditions. Thus fuel devolatilization rate (for solid fuels) is maintained, promoting formation of the spices that diminish the rate of nitrogen oxidation derived from fuel and air, including so-called prompt NOx formed during initial stage of hydrocarbons decomposition.

Moreover, for fuel with low volatile matter content, the proposed method will provides additional benefit by reaction with the hard-to-burn carbonaceous components [See Eq. (6) through (9)]. This promotes the formation of easy-to-burn species, which at the same time are responsible for NOx reduction as explained above.

In keeping with NOx reduction objective of this method, 5% to 50% of the burners 25 in the steam generator 1 may operate under conventional air staging conditions. For these burners the injection of steam, or flue gas, or their mixture injection is optional. The rest of the burners will operate under super-low-stoichiometric conditions between 0.05 to 0.7 conditions (fuel to air equivalence ration between 1.3 to 20). The supplemental heat input through these burners or adjacent, specially provided nozzles within plenum 30 also include the injection of preheated media such as steam, or flue gas, or mixture of the above that receive their energy through the proposed additional cycle duties. For fuels with low calorific heating value, oxygen injection into plenum 26 or burners 25 can be used to maintain the required temperature that ensures a substantial fuel conversion by reactions (3) through (9).

For coal burners 25 an optional exchange of the primary air and steam within plenum 30, or primary air and hot flue gas using fan 16, and/or primary air and mixture of steam with hot flue can be applied to enhance fuel devolatilization and conversion to CO and $H_2$ and thus achieve the higher suppression of NOx during their subsequent combustion within the furnace of the steam generator.

Due to fuel conversion by the said reactions (3) through (9) into readily combustible species, the combustion rate improves, therefore reducing oxygen availability for much slower reactions of thermal nitrogen oxidation by Zeldovich mechanism. Furthermore, said improvement of combustion rate allows lowering excess air requirements, which, in turn, results in decrease of electrical power consumption for the combustion air supply and flue gas evacuation. It will also reduce the thermal losses with the flue gas (See Equation 2), therefore providing a substantial contribution to the fuel-to-electric power conversion improvement.

Besides the arrangements of the simple steam cycle shown in FIG. 1 the simple steam cycle (power plant) may have another, less elaborate embodiment to provide concurrent NOx reduction and efficiency improvement using subset of that presented in FIG. 1 where use of evaporator 10 and eductor 28 is avoided. Here again the small portion of the steam 4 leaving high pressure turbine 2 denoted HPT or after reheat in 34 of the boiler 1 is used as the motive media to compress a larger portion of low pressure steam flow from turbine 2 denoted as LPT1 and LPT 2 in the steam compressor 9. After preheated up to 1000° F. within heat recovery area of the boiler 1 (self-explanatory—heat exchanger is not shown in FIG. 1) the steam is further injected into combustion zone through burners 625 or plenum 30 having openings on furnace side of the boiler 1. The oxidizer is admitted to the burners 25 in the sub stoichiometric quantities between 50% to 70%. The balance of the air is supplied through over-fire ports 33. With respect to proposed combustion process the fuel can be admitted in one or several locations. For gaseous fuel firing, all fuel or some portion of fuel can be supplied through plenum 30. For oil and coal fired applications, 20 to 30% fuel and steam can be admitted through plenum 30 between the main burner zone and over-fire ports 33 and the balance of fuel and steam is admitted through burners 25. The higher preheat temperature of the steam and fuel the higher is the yield of CO and $H_2$ therefore providing greater NOx reduction capabilities. At the same time, the greater steam and fuel temperatures the greater is energy credit to the furnace of boiler 1 therefore improving fuel-to-power conversion.

In keeping with the forth objective of this invention the reduction of heat losses with flue gas is achieved in the direct contact heat exchanger 11 in FIG. 1, where a large mass of water is injected into a flue gas to recover both thermal and latent heat content. The method of such a heat recovery is sufficient to achieve the objective of this invention but it is not limited to the arrangement shown in FIG. 2 that better explains the details of such system also depicted in FIG. 1 by element 11, 12, 13, 14, and 31 that represents an overall system integration within the embodiment of the steam cycle. Further explanation of the proposed waste heat recovery system is based on FIG. 2 unless otherwise noted.

To avoid the need to use an expensive heat transfer system and then contend with the weak heat transfer and corrosion, it is proposed to exploit a direct contact heat exchanger 1. For the environmentally clean fuels (such as natural gas) or for fuel with low sulfur content, the waste heat recovery system (WHRS) consists of at least one direct contact heat exchanger 1. A working (cooling) fluid, for instance, water supplied by pump 2 is used to absorb the heat from flue gas. Spray nozzles 15 connected to pump 2 distribute water inside the heat exchanger 1. Flue gas before discharge to an atmosphere enters heat exchanger 1, where its heat is absorbed by the water supplied by pump 2 and through line 4. The water preheated up to 200° F., is accumulated at the bottom of heat exchanger 1, is then supplied to another surface heat exchanger 5, to preheat combustion air and/or to be used for fuel drying.

The energy content in the working (cooling) media will exceeds air capability to absorb all the heat recovered from the working media. Therefore, stream of preheated water from 1 passing heat exchanger 6 is used to satisfy other plant (steam cycle) duties, including regenerative water heating to replace a portion of steam extracted from turbine 2 denoted LPT1 and LPT2 for the low-pressure regenerative heaters 5 shown in FIG. 1, and additional duties as disclosed by this invention (see heat exchangers 13 and 12 in FIG. 1) and/or can be used for liquid fuel preheat, and/or feed water preheat before economizer 7 in FIG. 1 for small package boilers, and/or external to the plant duties such as hot water supply, residential and commercial heating (not shown). The flue gas bypass line 14 is provided to control heat absorption by the WHRS in accordance with the additional duty requirements and/or to maintain draft in the stack. Without any additives, the absorption of NOx and SOx due to a direct contact in heat exchanger 1 with the circulating water of approximately 15-ppm to 25 ppm will provide additional environmental benefits of hazardous pollutant reduction. The neutralization of the weak nitric, sulfuric and carbonic acid in the circulating stream is performed according to common practice [1,6], therefore allowing the use of a traditional construction materials. The use of alternative low-temperature corrosion resistant materials, including corrosion resistant coating or non-metal materials, will provide economic benefits thanks to reduction of the cost for circulating water neutralization.

The invention's WHRS reduces flue gas temperature while having negligible pressure drop, which collectively leads to energy consumption reduction by the induced draft fan 11 on the order of 30% to 40%. The induced draft fan 11 is installed downstream of heat exchanger 1.

Figure 2:
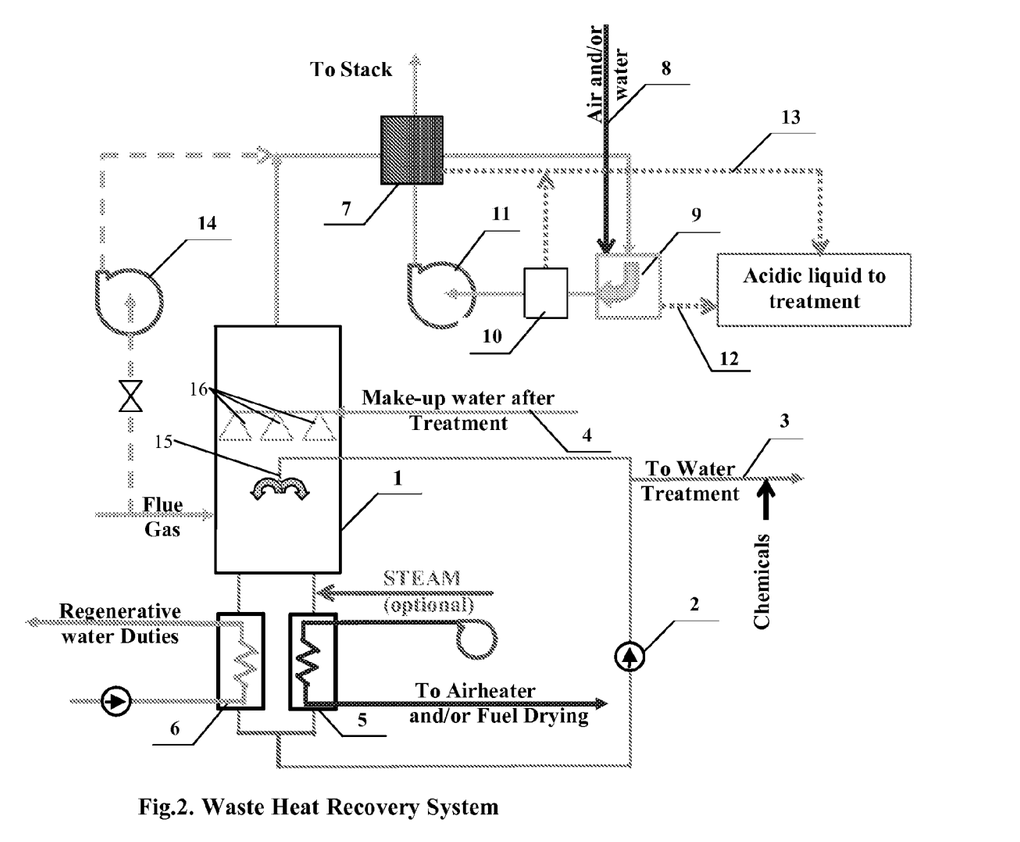
FIG. 2 illustrates typical components of a waste heat recovery system (WHRS) in fossil-fuel fired power plant

In keeping with the fourth object of this invention, a preferred arrangement of the waste heat recovery system from low-temperature combustion product is better explained by FIG. 2. The application of the method as shown in FIG. 2 is sufficient to achieve the objectives of this invention but it is not limited to the arrangement shown.

Here the flue gas enters direct heatexchanger 1 where flue gas undergoes mixing with the dispersed flow of water by nozzles 15 supplied by pump 2 as well as nozzles 16 spaying make-up water flow supplied through line 4. Heatexchanger 1 is thermally insulated outside and made of corrosion resistant material or having corrosion resistant coating inside. The water circulation through the exchanger 1 is maintained by pump 2 driven preferably by a steam pump. The efficiency related advantages of the steam driven pump for the steam cycle are well defined and are applicable to the preferred arrangement of the WHRS as proposed by this invention. The effluent circulating water temperature is maintained around 180° F. to 200° F. Due to such range of operational temperature, the absorption rate of a flue gas by water is low, therefore formation of carbonic and nitric acids in the circulating water is reduced.

For the purpose of the acidity control in the heatexchanger 1, the portion of the circulating water 3 ranging from 5% to 20% is supplied for chemical treatment using common methods [1,6]. Introduction of the chemically neutral or slightly alkaline make-up water 4 through nozzles 16 allows maintaining proper quality (pH) of the circulating water, and thus, to use conventional, lower-cost construction materials for heatexchanger 1. When alternative, corrosion resistant materials or surface coating are used, the requirement for pH can be relaxed therefore diminishing the use of the additives.

The heat accumulated by water in the bottom of the heatexchanger 1 is supplied to at least one heat exchanger 5 to preheat intake of combustion air and/or re-circulating cold and dry flue gas (taken after induced draft fan, see below). Thus, recovered additional thermal energy when supplied to the furnace replaces a portion of fuel energy required for steam generation process. This low potential dry flue gas energy may be also used for coal surface moisture removal and/or injection into the furnace for NOx reduction process (See flue gas stream cleaving exchanger 14 and supplied back into process by fan 16 in FIG. 1). An optional direct steam injection into water stream upstream of heatexchanger 5 in FIG. 2 increases its final temperature of the dry flue gas or other heated media.

The heat accumulated by water in the bottom of the heatexchanger 1 is also supplied to at least one heat exchanger 6 to fulfill the traditional regenerative duties and/or additional duties as proposed by this invention, for instance, to preheat stream of water before evaporation 10 (See heat exchanger 12 in FIG. 1). The replacement of gas-to-liquid heat exchangers with the water-to-water heat exchangers such as heatexchanger 6 leads to a net reduction of the heat transfer surface and diminishes costs of flue gas waste heat recovery while improving reliability of their operation thanks to low acidity of the heating media.

The flue gas leaving heat exchanger 1 in FIG. 2 is saturated with moisture having temperature between 180° F. to 210° F. undergoes further cooling in heatexchanger 7 by the cold and dry flue gas having temperature of about 65° F. to 85° F. after exiting scrubber/direct heatexchanger 9 where it was also subjected to a further cooling. The heatexchanger 7 has a corrosion resistant coating or is made of low cost corrosion resistant materials with heating surface that provides frequent, low pressure drop direction changes of the moisture laden flue gas thus effectively removing droplets from the stream. The drainage 13 is provided for the said acidic moisture removal. The energy consumption by the main induced draft fan 11 is also reduces thanks to significant volume change of the flue gas when passing the proposed low-pressure waste heat recovery system as shown in FIG. 1 and FIG. 2. Since flue gas exiting heatexchanger 7 gains back its temperature reaching 150° F. to 180° F., and maintains its natural draft ability while avoiding substantial moisture carry out typical for the previous art, it is also desired to claim it as the novel feature of the proposed WHRS.

The stream of water and/or ambient air is supplied to scrubber 9 or inertia separation device, for instance cyclone, located downstream of heatexchanger 7. The quantities of said stream of water and/or air is sufficient to providing further cooling of flow to accomplish an additional moisture condensation in 9. The cold and slightly wetted flue gas exiting 9 is evacuated by the main induced draft fan 11 that passes through a low-pressure drop fiber filter 10 to remove small liquid droplets including particles of one micron size. The drainage lines from 9 and 10 deliver liquid acidic stream for waste water treatment before disposal to a sewage or for reuse in the WHRS.

Thus, in conjunction with WHRS not only the efficiency of fuel utilization is improved but favorable physical and economically beneficial conditions for moisture and acidic steam removal are create.

For installations where heat in the flue gas exceeds the plant (steam cycle) traditional and/or additional duties, the balance of the hot flue gas shall partially bypass the heatexchanger 1 with the help of auxiliary fan 14. On the other hand, the excess of heat accumulated by WHRS can be used to satisfy any external duties including commercial heating and hot water supply.

The disclosed method and apparatus require simple equipment and widely available fabrication techniques, involves unsophisticated corrosion protection, and provides low maintenance cost and high reliability. Due to relatively low operating temperatures, a wide range of synthetic materials, or rubber, can be used to protect internal surfaces of the direct heat exchanger 1, heat exchangers 5, 6, 7, and 9. At the same time, a significant reduction of the flue gas temperature in the process waste heat recovery ensures practically complete water recovery from the flue gas while effectively minimizing water consumption for cooling. A portion of the recovered make-up water stream 4 will be used for continuous exchange with circulating water in direct heatexchanger 1, in order to maintain its constant temperature at the entrance, and to satisfy a required pH. Another portion of the recovered water can be used to supplement other needs such as make-up water in cooling towers, feedwater, and even as a drinking water after proper treatment.

As the combustion material balance shows, a surplus of water will be generated thanks to the use of the proposed waste heat recovery system, therefore making plant water balance positive, which is especially critical in the areas where water shortage exists.

In keeping with all four objectives of the this invention the preferred simple steam cycle configuration is depicted in FIG. 1 to achieve higher thermal performance on the order of 50% of fuel-to-power conversion and improved economics of plant operation. The disclosed method of efficiency improvement as presented is sufficient to provide the proposed method of fuel-to-power efficiency improvement, but the method itself is not limited to the plant diagram shown in FIGS. 1 and 2.

A preferred embodiment of the steam cycle is shown in FIG. 1 consisting of steam generator 1 where the chemical energy of fossil fuel is released in combustion process, a steam turbine 2 hydraulically linked to a condenser 3, whereas the rotor of turbine 2 is mechanically connected to electrical generator 4. The working media undergoes required preheat in the regenerative heaters 5 and 6, evaporation and superheat in the steam generator 1 and expends through turbine 2 where its energy is converted into mechanical energy assumed by the rotor of electrical generator 4. The said mechanical energy is realized by the rotor rotation in a magnetic field imposed on the electrical generator 4, produces desired electrical output. The low energy working media leaving turbine 2 is condensed in condenser 3, and then returns back to repeat the cycle and to sustain an economic operation.

The improvement of fuel-to-electricity conversion in the simple steam cycle is achieved by extraction of a portion of a low-level working media from turbine 2 (denoted as LPT1 and LPT2) and a smaller portion of a mid-level pressure working media (denoted as IPT) and subsequently subjecting low-level working media to a compression in the steam compressor 9. This steam is supplied to evaporator (or multi-evaporation station) 10 where it evaporates a stream of water preheated in heatexchanger 12. The high quality condensate from heating side of evaporator 10 is returned back to a group of regenerative heaters 5. The energy to heatexchanger 12 is provided by the waste heat recovery system, in particular, by the hot water collected in heatexchanger 11 that absorbs energy through a direct contact with the flue gas. The remaining portion of collected heat in 11 is supplied to the air preheater 13 before heater 8, where combustion air reaches it final preheat before entering windbox 26 of the steam generator 1. The stream of flue gas exiting direct heatexchanger 11 cools down in heatexchanger 14 giving up its energy to a stream of cold and dry flue gas supplied to the stack by induced draft fan 15. A portion of the preheated flue gas recirculates to a tri-sectional heater 8 with the help of recirculation fan 16 where dry flue gas picks up an additional energy through a heat recovery from wet flue gas leaving economizer 7. The stream of preheated and dry flue gas after 8 splits in two streams 17 and 18. Stream 17 is then supplied to the coal drier 19 equipped with dust precipitator 20 and dust return line 35. The coal crusher 22 reduces size of raw, wet coal and undergoes the moisture removal in 19 to improve fuel-to-power conversion efficiency. Temperature control in 19 is provided by tempering air stream 23. The flue gas exiting crusher can be returned to a waste heat system-direct heat exchanger 11. Dry crushed coal and coal dust from precipitator 20 of dryer 19 is delivered to the mill 24. Here a better grinding (fineness) is achieved thanks to the crushed and pre-dried coal in 19. The use of the dry flue gas 17 allows maintaining higher pulverized coal temperatures thanks to diminished concentration in the oxygen. The mill temperature is also controlled either by tempering air stream 26 or by dry flue gas bypassing heater 8 or optionally by flue gas exiting heater 14 and supplied by fan 16 (The last two options are not shown). The mixture of air and/or pulverized coal and flue is supplied to the burners 25 that increases the heat input with the fuel and suppresses NOx formation.

In some cases, instead of using heat transfer surfaces to preheat low quality steam leaving evaporator 10 (See FIG. 1) the optional preheat means for said low quality steam is achieved by mixing with stream 27 of the high temperature flue gas extracted from the boiler with the help of eductor 28 and injected into furnace in the vicinity of burners or directly through them, or through specialized compartments 30 having openings on the side adjacent to the internal surface of the furnace in boiler 1. The increased heat content of the input besides improved fuel-to-power conversion also improves fuel conversion rate to CO and $H_2$ under sub-stoichiometric conditions and thus concurrent NOx reduction.

Moisture condensation and removal from the wet flue gas that exits direct heatexchanger 11 is achieved in the tubular or plate heatexchanger 14 by the dry flue gas, which in turn undergoes further cooling and moisture removal in the direct contact heat exchanger 31 where stream 32 of water and/or ambient air is introduce to reach further cooling and improve moisture collection capabilities.

I claim:

1. A method of improving performance of a steam cycle comprising the steps of
   a) injecting an amount of partially expended turbine steam into a fuel stream or a portion of the fuel stream before entering a boiler furnace of the steam cycle by mixing the steam and the fuel stream,
   b) forming a mixture, in a pipe or a fuel injector, wherein the pipe or the fuel injector is located in or on the wall of the boiler furnace or proximally disposed to the boiler furnace,
   c) subjecting the mixture to heat generated by one or more adjacent boiler furnace burners, forming a heated mixture of hydrocarbons and steam, wherein the heated mixture is held in the boiler furnace for an appropriate time to form a times heated mixture in an amount of carbon oxide and hydrogen in excess of twenty percent in relation to a molar amount of the heated mixture, the timed heated mixture being mixed with combustion air and or oxygen in an amount to achieve near completed combustion before exiting the boiler furnace; and
   d) directing an exit gas from the boiler into a vessel containing a water sprayer and a water-to-water heat exchanger, the water-to-water heat exchanger heats a feed water stream to the boiler furnace.

2. The method of claim 1, further comprising taking the exit gas from the direct heat exchanger and piping the exit gas into a surface heat exchanger for cooling, adding ambient air to promote condensation, a cool flue gas, piping the cool flue gas to a moisture separator, a separated gas, and returning the separated gas the surface heat exchanger.

* * * * *